Dec. 26, 1950          G. E. GLISS          2,535,287

APPARATUS FOR ADVANCING AND WORKING PLASTIC MATERIAL

Filed Nov. 13, 1946          2 Sheets-Sheet 1

INVENTOR
G. E. GLISS
BY
ATTORNEY

Dec. 26, 1950  G. E. GLISS  2,535,287
APPARATUS FOR ADVANCING AND WORKING PLASTIC MATERIAL
Filed Nov. 13, 1946  2 Sheets-Sheet 2
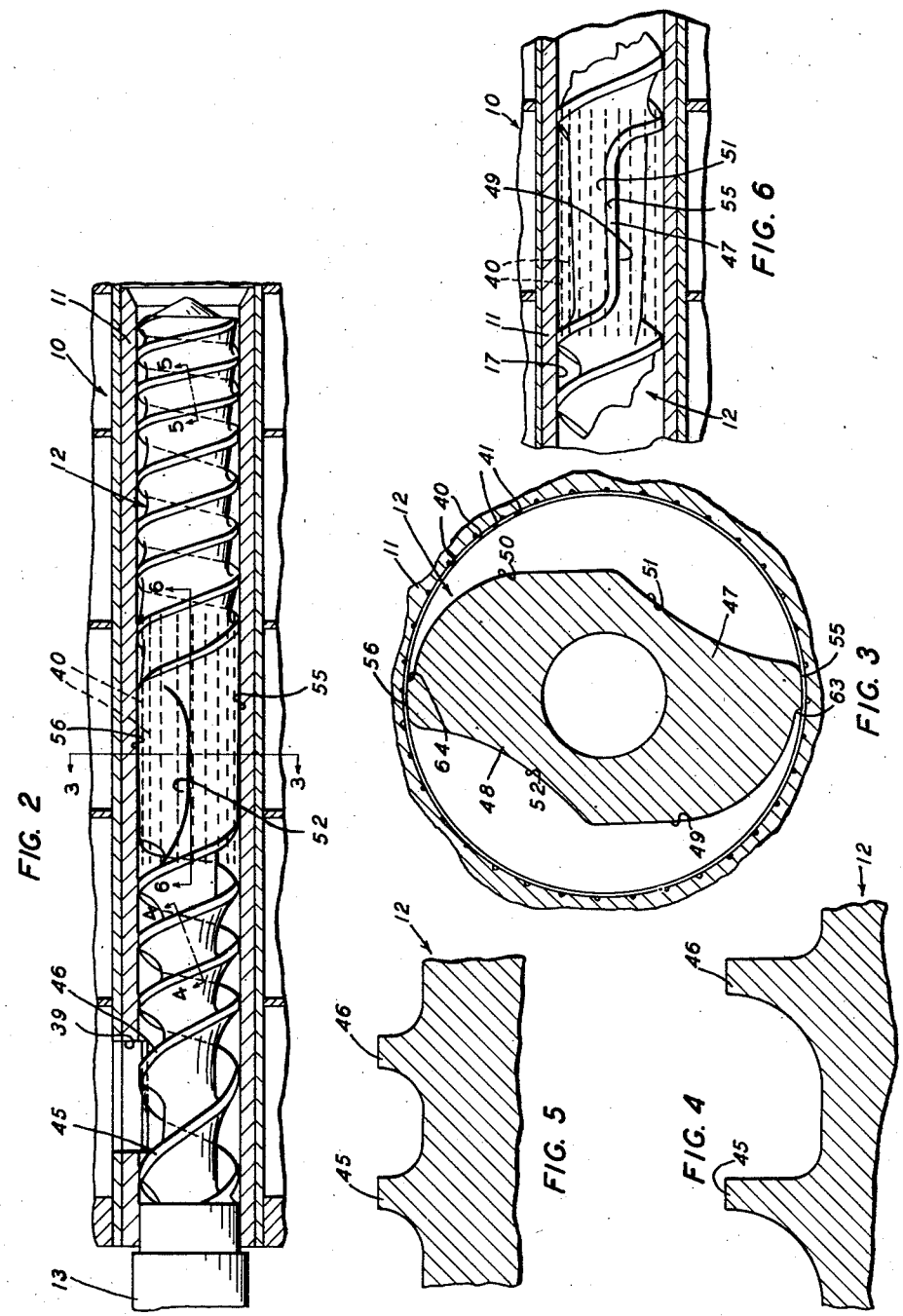
INVENTOR
G. E. GLISS
BY [signature]
ATTORNEY Patented Dec. 26, 1950

2,535,287

UNITED STATES PATENT OFFICE 2,535,287

APPARATUS FOR ADVANCING AND WORKING PLASTIC MATERIAL

George E. Gliss, Baltimore, Md., assignor to Western Electric Company, Incorporated, New York, N. Y., a corporation of New York Application November 13, 1946, Serial No. 709,529

3 Claims. (Cl. 18—13)

This invention relates to apparatus for advancing and working plastic material.

In the manufacture of extruded products, such as insulated conductors, plastic material, such as thermoplastic compounds or compounds including rubber or synthetic rubber-like materials, sometimes are milled to thoroughly mix and plasticize the material so that it may be extruded properly. The material then is inserted into an extruder, which extrudes the material upon a conductor, while the material is in a plastic condition. Such working operations are relatively expensive and require considerable handling of the material. In the past, there has been no apparatus for reducing or substantially eliminating the necessity of the working operations prior to the insertion of the material into the extruder.

An object of the invention is the provision of new and improved apparatus for advancing and working plastic material.

A further object of the invention is the provision of new and improved extruders for simultaneously forcing plastic material through extrusion apparatus and plasticizing the material.

An apparatus illustrative of the invention includes a stock screw having threaded end portions for advancing plastic material along a bore in an extrusion cylinder. The stock screw is provided with a plurality of blades at an intermediate portion thereof, each of which has a portion for kneading the material and a portion for beating the material. The bore may be provided with a plurality of grooves extending either longitudinally or spirally in the portion thereof intermediate of the ends of the cylinder to promote the flow of the material through the cylinder.

A complete understanding of the invention may be obtained from the following detailed description of an apparatus forming a specific embodiment thereof, when read in conjunction with the appended drawings, in which:

Fig. 2 is a reduced, fragmentary section of a portion of the apparatus;

Fig. 3 is a fragmentary section taken along line 3—3 of Fig. 2;

Fig. 4 is a fragmentary section taken along line 4—4 of Fig. 2;

Fig. 5 is a fragmentary section taken along line 5—5 of Fig. 2, and

Fig. 6 is a reduced, fragmentary section taken along line 6—6 of Fig. 2.

Figure 1:
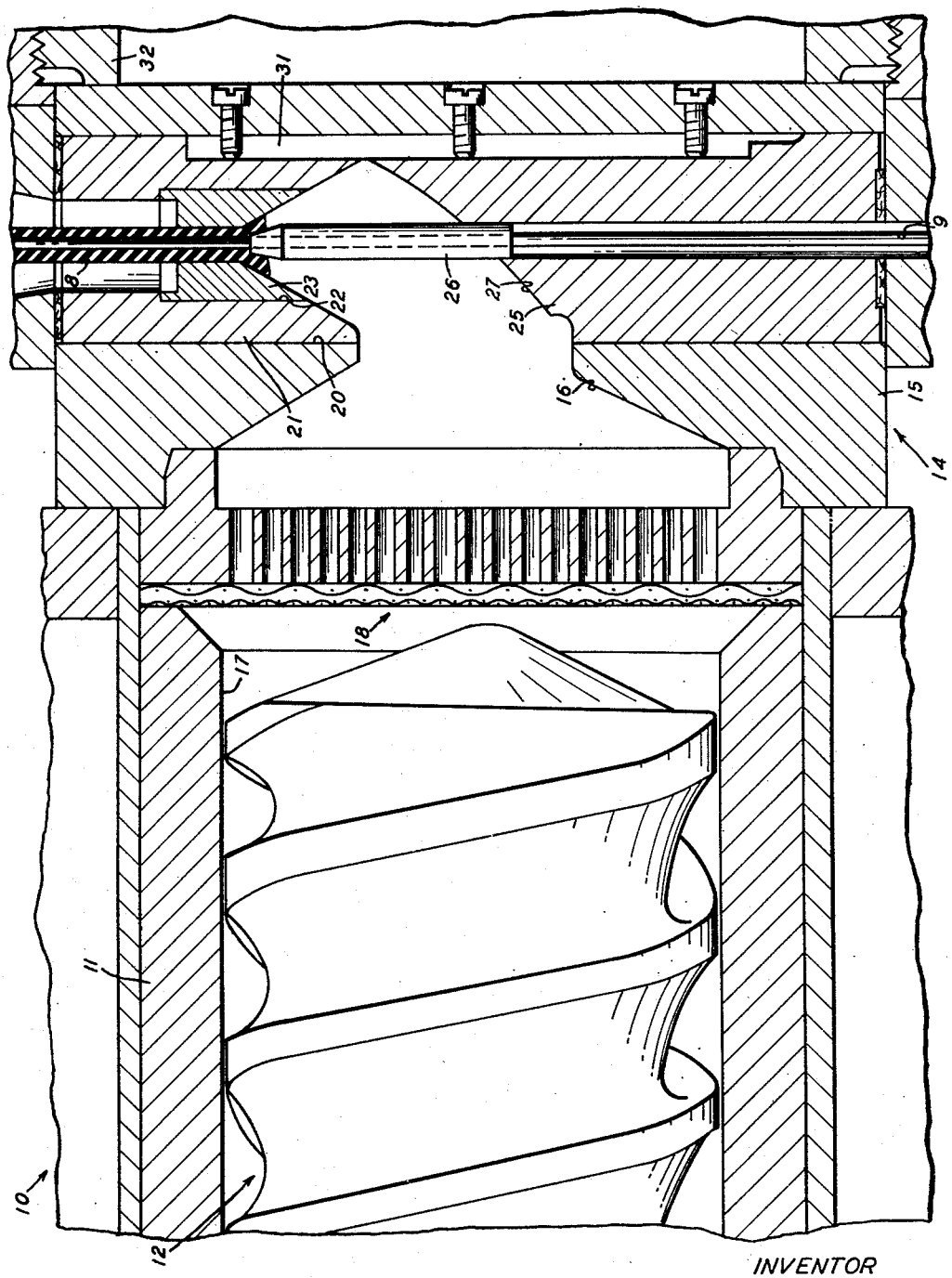
Fig. 1 is a fragmentary, horizontal section of an apparatus forming one embodiment of the invention.

Referring now in detail to the drawings, there is shown in Fig. 1 an extruder for forming a covering 8 from a compound of plastic material, such as a vulcanizable compound including rubber or a synthetic rubber-like material, or a compound including thermoplastic material, around a filamentary conductor 9, which may be bare or may be covered with a textile or plastic covering. The extruder includes a heated extrusion cylinder 10 having fastened therein a cylindrical liner 11 in which a stock screw 12 is rotatably mounted. The stock screw is rotated by a shaft 13 (Fig. 2) to force the plastic material under a high pressure through an extruding head 14 (Fig. 1). The extruding head includes a body member 15 having a tapered opening 16, which forms a continuation of a bore 17 in the liner 11 and communicates with an extrusion passage 20 formed in the extruding head transversely of the tapered opening 16. A strainer 18 is positioned between the bore 17 and the tapered opening 16. An annular die holder 21 positioned in the exit end of the bore 20 has a counterbore 22 formed therein in which is mounted a forming die 23.

The conductor 9 is advanced upwardly, as viewed in Fig. 1, by suitable conductor-advancing means, such as a capstan (not shown), through a core tube holder 25 and a core tube 26 extending from the core tube holder 25. The core tube holder is provided with an inclined concave surface 27 for deflecting the plastic material toward the die 23. An aligning plate 31 maintains the die holder 21 and the core tube holder 25, and thereby the die 23 and the core tube 26 centered relative to each other in the bore 20, and a retaining nut 32 holds these elements in the extruding head 14.

The liner 11 (Fig. 2) has a charging opening 39 through which the plastic material may be introduced into the bore 17. The bore 17 of the cylindrical liner 11 has a uniform diameter throughout its length, and is smooth-surfaced except for a portion intermediate of the ends thereof which has a plurality of grooves 40—40 extending longitudinally thereof, but which might extend helically around the interior of the liner. In forming the grooves 40—40, longitudinally extending ribs 41—41 are left. The stock screw 12 is provided with threads 45 and 46 for forcing the plastic material through the extrusion bore 17. The threads 45 and 46 have a relatively short pitch except for blade portions 47 and 48 thereof which extend substantially longitudinally with respect to the stock screw. Faces 49 and 50 of the blade portions 47 and 48, respectively, which are the foremost faces of the blade portions as the screw is rotated by the shaft 13 in a clockwise direction, as viewed in Fig. 3, are convex so that the material is heavily kneaded between the ribs 41—41 on the liner 11 and the faces 49 and 50.

Concave faces 51 and 52 of the blade portions 47 and 48, respectively, trail the convex faces 49 and 50 as the stock screw 12 is rotated. The concave portions 51 and 52 in effect are beating blades, and beat or slap the material. There is some clearance between tips 55 and 56 of the blade portions 47 and 48, respectively, and the wall of the extrusion bore 17 so that the material rolls on over the tips of the blade portions and is beaten by the concave portions 51 and 52. The tips 55 and 56 are wide so that a milling action occurs between the tips and the wall of the extrusion bore 17. Fillets 63 and 64 prevent jamming of the material by the wedging action of the convex faces 49 and 50. Thus, the material is severely kneaded by the convex faces 49 and 50, and is intensively beaten by the concave faces 51 and 52. The kneading and beating of the material thoroughly plasticizes the material so that its extrudability is high as it is extruded over the conductor 9 (Fig. 1).

Except for the blade portions 47 and 48 (Fig. 2), the pitch of the threads 45 and 46 decrease gradually from left to right, as viewed in Fig. 2, and the depth of the portions of the threads to the right of the blade portions is less than that of the portions of the threads to the left of the blade portions. The decrease in pitch and depth of the threads as the material is forced from the entrance end of the bore 17 to the exit end thereof, as illustrated by comparison of Figs. 4 and 5, cause the material to be worked by the helical portions of the threads, and it is worked substantially more severely to the right of the blades, as viewed in Fig. 2, than to the left thereof despite the fact that the material to the right of the blades is much more plastic than the material to the left thereof.

In the operation of the apparatus described hereinabove, the extrusion screw 12 is rotated in a clockwise direction, as viewed in Fig. 3, and a material to be extruded is fed into the extrusion cylinder 10 through the opening 39. The portions of the threads 45 and 46 to the left and right of the blade portions 47 and 48 thereof, as viewed in Fig. 2, force the material along the bore 17 towards the right. The convex faces 49 and 50, of the blade portions 47 and 48, respectively, and the intermediate portion of the liner 11 effectively knead the material to plasticize it, while the concave faces 51 and 52 beat the material. The combined kneading and beating thoroughly mixes and plasticizes the material.

The ribs 41—41 tend to hold the material against rotation as the material is forced thereagainst by the blade portions 47 and 48 of the threads 45 and 46 and aid in rolling the material up the convex faces 49 and 50. The material is forced from the liner 11 and through the strainer 18 and the extruding head 14, which forms the plasticized material around the conductor 9. The blade portions 47 and 48 of the threads 45 and 46, respectively, and the liner 11 serve to thoroughly plasticize the material as it is forced through the intermediate portion of the liner 11.

The above-described apparatus serves to mill and plasticize the plastic material without materially affecting the delivery efficiency of the apparatus. The apparatus also serves to thoroughly mix the various ingredients of the material in the intermediate or milling portions of the extrusion screw and the liner, and also is effective to mill and mix both thermoplastic materials and thermosetting materials.

What is claimed is:

1. An apparatus for working plastic insulating and vulcanizing material in a hollow cylinder, which comprises a member mounted rotatably in the cylinder, said member being provided with a blade having a convex face and also being provided with a blade having a concave face, and means for rotating the member in a predetermined direction, said convex face and said concave face facing generally in the direction of rotation of the member.

2. An apparatus for advancing and working plastic material in a hollow cylinder, which comprises a stock screw having at least one helical thread extending along a predetermined portion of the length thereof for advancing plastic material along a hollow cylinder, said stock screw also being provided with at least one blade extending along a portion of the stock screw other than the portion thereof along which the helical thread extends, said blade being provided with a concave face on one side thereof and a convex face on the other side thereof, and means for rotating the stock screw in a direction in which the convex face of the blade is in advance of the concave face thereof, whereby the convex face kneads the plastic material and the concave face beats the material.

3. An apparatus for advancing and working plastic material, which comprises an extrusion cylinder having therein a bore of a predetermined diameter, a portion of the length of said cylinder having internal grooves therein, an elongated member mounted rotatably in the bore and being provided with at least one thread for forcing plastic material along the bore, said thread extending along a predetermined portion of the member, said member also being provided with a kneading blade having a blunt tip and a convex face, said blade being of a predetermined width such that there is clearance between the tip of the blade and the wall of the bore, said member also being provided with a beating blade having a concave face, said beating blade being substantially narrower than the kneading blade, and means for rotating the member in a direction in which the convex face of the kneading blade and the concave face of the beating blade are the leading faces of these blades.

GEORGE E. GLISS.

REFERENCES CITED

The following references are of record in the file of this patent:

UNITED STATES PATENTS

| Number | Name | Date |
|---|---|---|
| 797,276 | Glauser | Aug. 15, 1905 |
| 1,403,681 | Gordon | Jan. 17, 1922 |
| 1,762,368 | Vandergrift | June 10, 1930 |
| 1,935,050 | Gordon | Nov. 14, 1933 |